(12) United States Patent
Le et al.

(10) Patent No.: US 8,412,483 B2
(45) Date of Patent: Apr. 2, 2013

(54) METHOD FOR AUTOMATED POSITION VERIFICATION

(75) Inventors: Qui V. Le, Pittsburgh, PA (US); Jayne L. Boynton, Jeannette, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 333 days.

(21) Appl. No.: 12/900,819

(22) Filed: Oct. 8, 2010

(65) Prior Publication Data

US 2012/0065927 A1 Mar. 15, 2012

Related U.S. Application Data

(60) Provisional application No. 61/382,047, filed on Sep. 13, 2010.

(51) Int. Cl.
*G01C 17/38* (2006.01)

(52) U.S. Cl. .......................... 702/150; 324/242; 702/94
(58) Field of Classification Search .................... 702/34, 702/35, 93, 94, 95, 104, 144, 150, 158, 159; 324/242

See application file for complete search history.

(56) References Cited

U.S. PATENT DOCUMENTS 6,914,427 B2 * 7/2005 Gifford et al. ................ 324/242
7,560,920 B1 * 7/2009 Ouyang et al. ............... 324/242

* cited by examiner

*Primary Examiner* — John H Le

(57) ABSTRACT

An improved method for verifying a position of a sensor with respect to an object under test includes detecting a signal from the sensor that is positioned at a given location on an object under test and comparing the signal from the sensor with a historical signal that is associated with a Uniquely Identified Location (UIL) on the object under test. If the two signals are consistent, and if the position of the sensor at the given location on the object under test is the same as the UIL, it is concluded that the position of the sensor is correct.

9 Claims, 1 Drawing Sheet

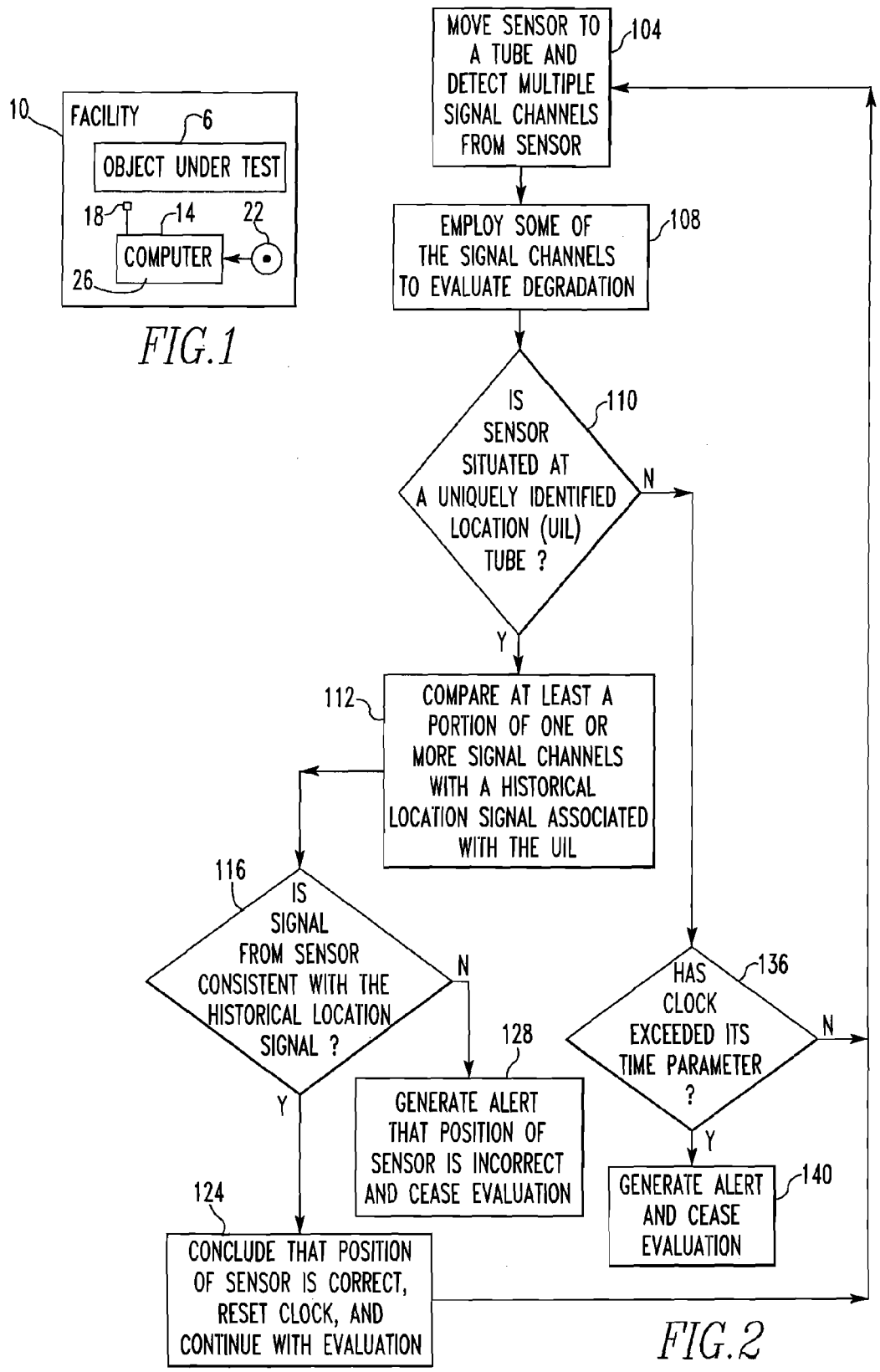

METHOD FOR AUTOMATED POSITION VERIFICATION

CROSS-REFERENCE TO RELATED APPLICATION

The instant application claims priority from U.S. Provisional Patent Application Ser. No. 61/382,047 filed Sep. 13, 2010, the disclosure of which is incorporated herein by reference.

BACKGROUND

1. Field

The disclosed and claimed concept relates generally to testing equipment and methodologies and, more particularly, to a method of automatically verifying a position of a sensor during performance of an evaluation procedure on an object under test.

2. Related Art

Periodic maintenance and evaluation are required for numerous types of equipment. Certain types of equipment have very large numbers of components that are very similar to one another and the testing of which is likewise similar to one another, and thus it has been known to automate certain testing functions with robots and the like.

In the evaluation of certain types of equipment, it is necessary to evaluate a degree of degradation or change over a period of time of the equipment. In such circumstances, it is typically necessary to compare the results of current testing with the results of prior testing. In so doing, it is necessary to retrieve historical data, compare it with current data, and evaluate any changes that have occurred in order to characterize the degradation of each such component of an object under test. However, it is also necessary to ensure that the proper historical data is being compared with the proper current data, and it is therefore also necessary to periodically verify that the position of the testing equipment is correct, meaning that the component which is being evaluated by sensors for comparison with historical data is the correct component and not, say, an adjacent, different component.

It thus has been known to rely upon one or more Uniquely Identified Locations (UILs) on an object under test to determine a current position of a sensor, for instance, of a testing apparatus. Conventional UILs on a steam generator in a nuclear power plant might include a number of locations on the steam generator such as plugged tubes, support rods, painted tubes, and the like. That is, the position of the sensor at any given time is determined in respect to one or more UILs on the object under test. It therefore has also been known to periodically (during the course of an evaluation procedure) robotically move the sensor to one of the UILs in order to confirm that the position from which the sensor was moved to the UIL is, in fact, the position where the system believed it to be. While such methodologies have been generally effective for their intended purposes, they have not been without limitation.

An example of an environment in which an object under test has numerous similar components that must be individually evaluated is in the case of a steam generator of a nuclear power plant. Such a steam generator might include ten thousand or more tubes that are in fluid communication with a primary loop of the nuclear power plant, and each of the tubes must be periodically evaluated for degradation in order to avoid the potential for leakage of primary coolant into a secondary loop. At various times, such testing is performed by causing a robotically controlled eddy current sensor to be passed through the various tubes of the steam generator, and the signal from the eddy current sensor is compared with a historical signal that is stored in a storage in order to enable an evaluation to be made of possible degradation of the tube. In order to ensure that the retrieved historical data is being compared with the proper current data, the robot moves the probe at least once every four hours, say, to a UIL to ensure that the position of the sensor immediately prior to its movement to the UIL was the position where the system believed that the sensor has been situated. However, such movement of the sensor to a UIL and then back to a component such as a tube has been time consuming and wasteful of resources. It thus would be desired to provide an improved system that overcomes these and other shortcomings associated with the known art.

SUMMARY

An improved method for verifying a position of a sensor with respect to an object under test includes detecting a signal from the sensor that is positioned at a given location on an object under test and comparing the signal from the sensor with a historical signal that is associated with a Uniquely Identified Location (UIL) on the object under test. If the two signals are consistent, and if the position of the sensor at the given location on the object under test is the same as the UIL, it is concluded that the position of the sensor is correct and the evaluation procedure can continue on the object under test.

Accordingly, an aspect of the disclosed and claimed concept is to provide an improved method of verifying a position of a sensor with respect to an object under test by relying upon a signal from the sensor to assess the sensor's position rather than moving the sensor to a known location on the object under test to evaluate its former position.

Another aspect of the disclosed and claimed concept is to provide an improved method of testing that saves time and avoids the wasting of valuable resources.

Other aspects of the disclosed and claimed concept are provided by an improved method of verifying a position of a sensor with respect to an object under test during an evaluation procedure performed with the use of the sensor on the object under test in which at least one of the sensor and the object under test moves with respect to the other of the sensor and the object under test. The general nature of the method can be stated as including detecting a signal from the sensor positioned at a location on the object under test, making a determination that the location on the object under test is the same as a Uniquely Identified Location (UIL) on the object under test, determining from a comparison of at least a portion of the signal from the sensor with at least a portion of a stored historical signal associated with the UIL that the signal from the sensor is consistent with the historical signal associated with the UIL and, responsive to the determining, concluding that the position of the sensor during the evaluation procedure is correct.

BRIEF DESCRIPTION OF THE DRAWINGS

A further understanding of the disclosed and claimed concept can be gained from the following Description when read in conjunction with the accompanying drawings in which:

FIG. 1 is a schematic depiction of a facility that includes an object under test upon which an improved method in accordance with the disclosed and claimed concept can be performed: and FIG. 2 is a flowchart depicting certain aspects of the improved method.

Similar numerals refer to similar parts throughout the specification.

DESCRIPTION

An exemplary object under test 6 of an exemplary facility 10 is depicted generally in FIG. 1. While for purposes of the disclosure herein, the object under test 6 is described as being a steam generator and the facility 10 is described as being a nuclear power plant, it is understood that other facilities and objects under test can be advantageously subjected to the improved method described herein without departing from the present concept. The exemplary facility 10 can be described as further comprising for a computer 14 that robotically controls an eddy current sensor 18 in order to move the sensor 18 among and through the various tubes of the exemplary steam generator, i.e., the exemplary object under test 6. The computer 14 comprises a processor and a storage, with one or more routines being stored in the storage for execution on the processor. The exemplary storage can be any one or more of RAM, ROM, EPROM, EEPROM, FLASH, and the like and in the depicted exemplary embodiment includes a machine readable storage medium such as the exemplary CD-ROM 22 depicted generally in FIG. 1

As is understood in the relevant art, a steam generator of a nuclear power plant includes a tube sheet that is in form of a plate of stainless steel or other metal that may be on the order of twenty-two inches thick. The two ends of each tube pass through the tube sheet and are affixed to the tube sheet by being hydraulically expanded into engagement with a hole formed in the tube sheet. The pattern of expansion of the tube into engagement with the tube sheet is typically unique, and the patter of expansion as a function of distance along the tube can therefore be stored in the storage for subsequent retrieval. Depending upon a number of factors, such as the degree of uniqueness of the pattern of expansion of the tube within the tube sheet, the stored pattern of expansion can be relied upon as a Uniquely Identified Location (UIL) and, more particularly, as a UIL tube. That is, while any steam generator may include a number of locations such as plugged tubes, support rods, painted tubes, and the like that might serve as conventional UILs, in the present concept the tubes themselves are UILs and, more particularly, are UIL tubes based upon the uniqueness of the pattern of expansion of the tube metal into engagement with the tube sheet.

That is, at the time of manufacture of the steam generator or at another time, the sensor 18 is passed through each tube and its signal is recorded and stored in the storage for future retrieval and comparison with another signal from the same tube at a later time. Such comparison is performed in order to assess the degradation or other change of the tube as a function of time. Advantageously, however, the historical signal stored in the storage can also be employed to designate the tube as a UIL tube if the pattern of expansion as represented by the historical signal is sufficiently unique from other historical signals of other nearby tubes. Each such historical signal stored in the storage will be associated with a particular tube of the steam generator, and more particularly, with the location of the tube on the steam generator. In this regard, it is noted that the expression "location" and variations thereof shall refer generally to the place where a portion of the object under test 6 is situated, whereas the expression "position" and variations thereof shall refer generally to the place where the sensor 18 is situated.

During performance of an evaluation procedure on the steam generator, the eddy current sensor 18 is robotically manipulated by the computer 14 to pass through all of the tubes of the steam generator, which is the exemplary object under test 6. It is noted that the position of the sensor 18 may also be referred to as the working point of the robot. The eddy current sensor 18 typically has numerous data channels which enable output signals from the eddy current sensor 18 in different frequency bands to be simultaneously detected and recorded. Signals from some of the signal channels of the sensor 18 are usable for comparison with a retrieved historical signal for the same tube in order to evaluate the possible degradation of the tube. Signals from other signal channels of the sensor 18 are usable for comparison with certain aspects of the retrieved historical signal in order to verify the position of the sensor 18.

That is, the plurality of signal channels of the sensor 18 enable both an evaluation of possible degradation of the tube with certain of the channels as well as confirmation of the position of the sensor 18 with other channels. Each tube is evaluated for possible degradation. However, typically only those tubes which are designated as UIL tubes are additionally evaluated for purposes of verifying the position of the sensor 18. Any of a wide variety of criteria can be employed in establishing certain tubes as being UIL tubes. For example, a given tube might have one or more dents formed therein at specific locations along its length, and such dents likely will be sufficiently unique that they can serve as a signature of that particular tube. Similarly, one or more particular instances of wear of a tube and/or one or more instances of buffing of a tube may additionally or alternatively be employed in assessing a given tube as having a unique signal and therefore designating the tube as a UIL tube. However, in new installations, the tubes are likely to be largely free of dents, wear, and buffing, and thus the tubes that are designated as UIL tubes typically will be the tubes having the most unique pattern of expansion of the tube against the tube sheet. As can be readily understood, the historical location signal for any given UIL tube will be in the form a signal having an amplitude that varies as a function of distance into the tube.

The various locations of the UIL tubes on the steam generator are compiled in a list 26 that is stored in the storage and that is accessible to the computer 14. Most typically, when the computer 14 robotically moves the sensor 18 to a new tube for purposes of evaluating the tube, the location of the tube on the object under test 6 is compared with the list 26 to make a determination whether the location of the tube is the same as a UIL, meaning that the tube at the location is actually a UIL tube. If the tube is determined to not be a UIL tube, the sensor 18 is passed through the length of the tube and the signal from the sensor 18 is compared with a historical degradation signal that is stored in the storage and that is retrieved for purposes of evaluating the degradation of the tube.

On the other hand, if the location of the tube is identified in the list 26 as being the same as that of a UIL, meaning that the tube is a UIL tube, the signal from the sensor 18 is used both to evaluate degradation of the tube as well as to confirm the position of the sensor 18. That is, signal components from certain signal channel of the sensor 18 are compared with a historical degradation signal that has been stored in the storage and that is associated with the tube in order to evaluate degradation, and other signal components from other signal channels of the sensor 18 are compared with a historical location signal that is also stored in the storage. If the location signal components from the sensor 18 are determined to be consistent with the historical location signal that was retrieved from the storage, the position of the sensor 18 is verified and the evaluation procedure continues. That is, the position of the sensor 18 is verified in the course of performing the evaluation operation on a tube and without resort to movement of the sensor 18 to and from a conventional UIL.

However, if a comparison of the location signal components from the sensor 18 are inconsistent with the retrieved historical location signal, an alert is generated in order to indicate to a technician that the position of the sensor 18 is suspect and is likely incorrect. In such a situation, the evaluation procedure will be suspended.

As has been suggested elsewhere herein, the requirements of the facility 10 typically require that the position of the sensor 18 be verified periodically and with a certain level of frequency. For instance, the requirements of the facility 10 may be that the position of the sensor must be verified every four hours at a minimum. As such, whenever the position of the sensor 18 is verified based upon a comparison of a location signal from the sensor 18 with a historical location signal from the storage, a "clock" is reset and the position of the sensor 18 will then need to be verified again within the next four hours (according to the example parameter set forth herein). It is understood that various other parameters may be required by the facility 10 to be met in order for the evaluation procedure to continue on the object under test 6.

A flowchart is depicted in FIG. 2 detailing certain aspects of an improved method of verifying a position of the sensor 18 with respect to the object under test 6 in accordance with the disclosed and claimed concept. The method can be generally said to begin, as at 104, where the computer 14 robotically moves the sensor 18 to a tube of a steam generator and multiple signal components from multiple signal channels of the sensor 18 are detected. As has been set forth elsewhere herein, the exemplary facility 10 is a nuclear power plant and the exemplary object under test 6 is a steam generator of the nuclear power plant, but it is reiterated that the method described herein can be advantageously employed in other types of facilities and other objects under test without departing from the present concept. The signal components detected at 104 typically we be degradation signals, and such degradation signals are employed, as at 108, to evaluate degradation of the tube. Typically, a historical degradation signal that is associated with the tube is retrieved from the storage, and a comparison is performed between the retrieved historical degradation signal and the degradation signal received from the sensor 18.

It is also determined, as at 110, whether the location of the tube that is being evaluated by the sensor 18 is the same as that of a UIL tube. Such an inquiry involves comparing the location of the tube that is being evaluated (based upon the position of the sensor 18) with the list 26 of UILs. Such a determination can be performed at any time and is depicted in the flowchart of FIG. 2 as occurring subsequent to the degradation evaluation at 108 merely for purposes of clarity, it being understood that the evaluation at 110 can be performed (and likely will be performed) prior to the detection of any signal from the sensor 18.

If it is determined as at 110 that the tube is a UIL tube, one or more signal channels of the sensor 18 that form a location signal are compared with a retrieved historical location signal that is associated with the UIL tube in order to verify the position of the sensor 18. If it is determined, as at 116, that the location signal from the sensor 18 is consistent with the historical location signal, processing continues, as at 124, where the system concludes that the position of the sensor 18 is correct and is therefore verified. In such a situation, the "clock" or other parameter of the facility 10 is reset and the evaluation procedure continues. Processing thereafter continues, as at 104.

However, if the location signal from the sensor 18 is determined, as at 116, to be inconsistent with the retrieved historic location signal, processing continues, as at 128, where an alert is generated to indicate that the position of the sensor is suspect and is likely incorrect. The evaluation procedure is then ceased.

As mentioned above, it is possible that the tube that is being evaluated is not a UIL tube, and in fact this is the more likely scenario in the present exemplary embodiment. That is, since in the exemplary embodiment the position of the sensor 18 needs to be verified only once every four hours, and since the computer 14 can evaluate approximately three hundred tubes per hour, roughly only one in about twelve hundred tubes on average must be designated as a UIL tube. For reasons of simplicity, however, probably at least twice as many tubes will be designated as UIL tubes in order to avoid an unnecessary cessation of the evaluation procedure.

If it is determined, as at 110, that the tube is not a UIL tube, it is still determined, as at 136, whether the "clock" or other timing or other parameter has been exceeded, such as if more than four hours (by way of example) have elapsed since the last time the position of the sensor 18 was verified. If the timing or other parameters have not been exceeded, as at 136, processing continues, as at 104. However, if the "clock" or other parameters have been exceed, as at 136, processing continues, as at 140, where an alert is generated and the evaluation procedure is ceased.

It thus can be seen from the foregoing that the position of the sensor 18 can be verified by using signals, i.e., location signals from the sensor 18, that are generated and detected during the course of the evaluation procedure. The designation of such UIL tubes thus avoids the need for the sensor 18 to be periodically moved to a UIL such as a blocked tube, a support rod, or a painted tube in order to verify the position of the sensor 18, which results in saved time and reduced cost. Moreover, the automation of such position verification of the sensor 18 avoids the need for a technician to independently evaluate visually, for instance, the position of the sensor 18 once it has been moved from a tube to a UIL such as a plugged tube, a support rod, or a painted rod, which spares expense and avoids the wasting of limited labor resources.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method of verifying a position of a sensor with respect to an object under test during an evaluation procedure performed with the use of the sensor on the object under test in which at least one of the sensor and the object under test moves with respect to the other of the sensor and the object under test, the method comprising:
   detecting a signal from the sensor positioned at a location on the object under test;
   making a determination that the location on the object under test is the same as a Uniquely Identified Location (UIL) on the object under test;
   determining from a comparison of at least a portion of the signal from the sensor with at least a portion of a stored historical signal associated with the UIL that the signal from the sensor is consistent with the historical signal associated with the UIL; and responsive to the determining, concluding that the position of the sensor during the evaluation procedure is correct.

2. The method of claim 1, further comprising:
detecting as the signal from the sensor both a degradation signal and a location signal; and
employing the degradation signal to assess possible degradation of a portion of the object under test disposed at the location on the object under test.

3. The method of claim 1, further comprising:
moving the at least one of the sensor and the object under test among a plurality of locations on the object under test;
detecting the signal from the sensor at each of the plurality of locations;
periodically making a determination that a location on the object under test from among the plurality of locations is the same as a UIL from among a plurality of UILs on the object under test; and
periodically concluding that the position of the sensor during the evaluation procedure is correct.

4. The method of claim 3 wherein the periodically concluding occurs with a frequency that meets a number of predetermined parameters established for the object under test and, responsive thereto, continuing the performance of the evaluation procedure.

5. The method of claim 3 wherein the periodically concluding fails to occur with a frequency that meets a number of predetermined parameters established for the object under test and, responsive thereto, suspending performance of the evaluation procedure.

6. The method of claim 1 wherein the determining from a comparison of at least a portion of the signal from the sensor with at least a portion of a stored historical signal associated with the UIL comprises comparing the signal from the sensor with a historical signal that is representative of a pattern of expansion of a tube against a tube sheet at a UIL of a steam generator of a nuclear power plant.

7. The method of claim 1 wherein the determining from a comparison of at least a portion of the signal from the sensor with at least a portion of a stored historical signal associated with the UIL comprises comparing the signal from the sensor with a historical signal that is representative of at least one of:
at least one dent,
at least one instance of wear, and
at least one instance of buffing,
in a tube at a UIL of a steam generator of a nuclear power plant.

8. The method of claim 1, wherein the determining that the signal from the sensor is consistent with the historical signal comprises comparing a amplitude of at least a component of the signal as a function of distance with an amplitude as a function of distance of the historical signal.

9. The method of claim 1, wherein the making of the determination comprises:
comparing the location on the object under test with a list of UILs on the object under test; and
identifying in the list a UIL that matches the location on the object under test.

\* \* \* \* \*